United States Patent
Ouchi

(10) Patent No.: US 7,573,462 B2
(45) Date of Patent: Aug. 11, 2009

(54) IMAGE DISPLAY APPARATUS, MULTI DISPLAY SYSTEM, COORDINATE INFORMATION OUTPUT METHOD, AND PROGRAM FOR IMPLEMENTING THE METHOD

(75) Inventor: Akihiro Ouchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 11/145,310

(22) Filed: Jun. 3, 2005

(65) Prior Publication Data

US 2005/0270278 A1    Dec. 8, 2005

(30) Foreign Application Priority Data

Jun. 4, 2004   (JP)   ............................. 2004-167626

(51) Int. Cl.
*G06F 3/033*   (2006.01)
*G09G 5/00*   (2006.01)

(52) U.S. Cl. ........................ 345/157; 345/173; 345/179; 345/1.2; 345/1.3; 178/18.01; 178/18.03; 178/19.01; 715/856; 715/857; 715/858; 463/37

(58) Field of Classification Search ............ 345/1.1–1.3, 345/157, 163, 173, 179; 178/18.01, 18.03, 178/19.01; 463/37
See application file for complete search history.

(56) References Cited

U.S. PATENT DOCUMENTS

| 5,231,381 | A | * | 7/1993 | Duwaer ...................... 345/174 |
| 5,374,787 | A | | 12/1994 | Miller et al. |
| 5,488,204 | A | | 1/1996 | Mead et al. |
| 2004/0263424 | A1 | * | 12/2004 | Okuley ....................... 345/1.1 |
| 2005/0007351 | A1 | * | 1/2005 | Fabrick, II .................. 345/181 |

FOREIGN PATENT DOCUMENTS

| JP | 6-44001 A | 2/1994 |
| JP | 8-286835 A | 11/1996 |
| JP | 2000-330687 A | 11/2000 |
| JP | 2001-282457 A | 10/2001 |
| JP | 2004-94964 A | 3/2004 |

* cited by examiner

*Primary Examiner*—Henry N Tran
(74) *Attorney, Agent, or Firm*—Rossi, Kimms & McDowell, LLP

(57) ABSTRACT

An image display apparatus which is capable of operating smoothly over a plurality of image display devices. When a pen has come into continuous contact with a first display screen, a system controller determines whether or not the pen has got out of contact with an edge of the first display screen. When the system controller determines that the pen has got out of contact with the first display screen at the edge thereof, a time period elapsed is measured while the pen is held out of contact with the first display screen at the edge thereof. When the measured time period is less than a predetermined time period, the system controller outputs pointing information indicative of a position of the edge of the first display screen with which the pen got out of contact, to indicate that the pen has been held in the continuous contact with the first display screen.

11 Claims, 5 Drawing Sheets

IMAGE DISPLAY APPARATUS, MULTI DISPLAY SYSTEM, COORDINATE INFORMATION OUTPUT METHOD, AND PROGRAM FOR IMPLEMENTING THE METHOD

BACKGROUND OF THE INVENTION

1. Field of the Invention

The present invention relates to an image display apparatus, a multi display system, a coordinate information output method, and a program for implementing the method.

2. Description of the Related Art

A coordinate information output device has been used as a device for inputting coordinate information to a personal computer, and is divided into two types: one that handles relative coordinates such as a mouse, and the other that handles absolute coordinates such as an on-screen digitizer.

A mouse is horizontally moved on a flat surface of a desk or the like to obtain and input its relative movement amount to a personal computer as coordinate information. This causes the cursor or pointer (hereinafter generically referred to as "the cursor") on the display screen to be moved by the movement amount from the present cursor position. When a mouse button is clicked (pressed and released), the mouse inputs its click operational information to the personal computer.

On the other hand, an on-screen digitizer is equipped with a coordinate input screen, a pointing means for pointing desired positions on the coordinate input screen (hereinafter generically referred to as "the pen"), and a coordinate position detecting means for detecting the positions pointed by the pen as absolute coordinates corresponding one-to-one to the coordinate input screen. This on-screen digitizer is connected to a personal computer to input the coordinate information of a position on the coordinate input screen pointed by the pen. This causes the cursor on the display screen to be moved to the pointed position. Further, the on-screen digitizer inputs its operational information to a personal computer by operating a switch provided on a pen and corresponding to a mouse button or by touching the display screen by the pen.

A click operation by the mouse button corresponds to a pen-down and pen-up operation onto the coordinate input screen in the on-screen digitizer. A mouse drag operation (moved while the button is pressed) corresponds to a movement of the pen in the pen-down state on the coordinate input screen of the on-screen digitizer. The termination of the mouse drag operation corresponds to a pen-up operation in the on-screen digitizer. Incidentally, if the pen goes outside of the coordinate input area, the digitizer recognizes the situation as a pen-up.

In accordance with the recent expanding usage opportunities of personal computers, these coordinate information output devices are selectively used as the situation demands.

For example, PC operating systems (OS), the "Windows 98" version and subsequent versions, made by Microsoft Corporation, U.S.A. are provided with a multi display function for dividing the screen of one personal computer into screens for a plurality of displays, enabling to increase the displaying capacity.

In using such a multi display function, there can be such a case where the operating range of a mouse may extend over screens for a plurality of displays. For example, a case where a file on the screen area of the first display is shifted to the screen area of the other display by a drag operation, or a case where a line is drawn over screen areas of a plurality of displays using a drawing application.

A mouse, which is for inputting relative coordinates, is rather easy to operate over a plurality of displays. On the other hand, an on-screen digitizer, which is for inputting absolute coordinates, cannot operate over a plurality of displays.

Because of this, some on-screen digitizers have a digitizer controller provided separately from a plurality of displays, in order to cover the operation of coordinate designation over the plurality of displays (e.g. Japanese Laid-Open Patent Publication (Kokai) No. H08-286835).

The above-mentioned digitizer controller is provided as a separate device for a multi display system that is comprised of a plurality of displays. Therefore, if the displays are provided with respective on-screen digitizers, the multi display system has a redundant dual structure.

However, in the above multi display system that is comprised of a plurality of displays that are provided with respective on-screen digitizers, each of the on-screen digitizers inputs absolute coordinates corresponding one-to-one to the corresponding display screen, as a coordinate input screen, to a personal computer. Therefore, when an operation is carried out over a plurality of displays, the continuity of the coordinate input area is interrupted at the frames of the display screens. As a result, it is impossible to conduct a drag operation over a plurality of displays.

SUMMARY OF THE INVENTION

It is an object of the present invention to provide an image display apparatus, a multi display system, and a coordinate information output method, which are capable of operating smoothly over a plurality of image display devices, and a program for implementing the method.

To attain the above object, in a first aspect of the present invention, there is provided an image display apparatus comprising a display device including a display screen having an edge and a coordinate information output device that outputs pointing information indicative of the position pointed by a pointer, wherein the coordinate information output device comprises a first determining device operable when the pointer has come into continuous contact with the display screen, to determine whether or not the pointer has got out of contact with the edge of the display screen, a time measuring apparatus operable when the first determining device determines that the pointer has got out of contact with the display screen at the edge thereof, to measure a time period elapsed while the pointer is held out of contact with the display screen at the edge thereof, a second determining device that determines whether or not the measured elapsed time period is less than a predetermined time period, and an output device operable when the measured time period is less than the predetermined time period, to output the pointing information indicative of a position of the edge of the display screen with which the pointer got out of contact, to indicate that the pointer has been held in the continuous contact with the display screen.

Preferably, the image display apparatus is connected to another image display apparatus substantially identical in configuration as the image display apparatus, the image display apparatus comprising a coordinate information input device that inputs pointing information delivered by the other image display apparatus, and the output device of the coordinate information output device synthesizes the delivered pointing information with the pointing information outputted by the coordinate information output device and outputs the synthesized information.

More preferably, the coordinate information output device comprises a third determining device operable when the measured time period is less than the predetermined time period, to determine whether or not the pointing information has been input by the other image display apparatus, and a fourth determining device operable when the pointing information has been input from the other image display apparatus, to determine that the pointer has shifted from a state where the pointer is in contact with the display screen to a state where the pointer is in contact with a display screen of the other image display apparatus.

Preferably, the first determining device is provided outside of the display screen.

To attain the above object, in a second aspect of the present invention, there is provided a multi display system which comprises a plurality of image display apparatuses according to the first aspect, and the image display apparatuses are arranged side by side.

To attain the above object, in a third aspect of the present invention, there is provided a coordinate information output method applied to an image display apparatus comprising a display device including a display screen having an edge and a coordinate information output device that outputs pointing information indicative of the position pointed by a pointer, comprising a first determining step of determining whether or not the pointer has got out of contact with the edge of the display screen when the pointer has come into continuous contact with the display device, a time measuring step of measuring a time period elapsed while the pointer is held out of contact with the display screen at the edge thereof, when in the first determining step it is determined that the pointer has got out of contact with the display screen at the edge thereof, a second determining step of determining whether or not the measured elapsed time period is less than a predetermined time period, and an output step of outputting the pointing information indicative of a position of the edge of the display screen with which the pointer got out of contact, to indicate that the pointer has been held in the continuous contact with the display screen, when the measured time period is less than the predetermined time period.

Preferably, the coordinate information output method comprises a coordinate information input step of inputting pointing information delivered by another image display apparatus substantially identical in configuration as the image display apparatus, and in the output step, the delivered pointing information is synthesized with the pointing information outputted by the coordinate information output device and the synthesized information is outputted.

More preferably, the coordinate information output method comprises a third determining step of determining whether or not the pointing information has been input by the other image display apparatus when the measured time period is less than the predetermined time period, and a fourth determining step of determining that the pointer has shifted from a state where the pointer is in contact with the display screen to a state where the pointer is in contact with a display screen of the other image display apparatus when the pointing information has been input from the other image display apparatus.

To attain the above object, in a fourth aspect of the present invention, there is provided a program for causing a computer to execute a coordinate information output method applied to an image display apparatus comprising a display device including a display screen having an edge and a coordinate information output device that outputs pointing information indicative of the position pointed by a pointer, the program comprising a first determining module for determining whether or not the pointer has got out of contact with the edge of the display screen when the pointer has come into a continuous contact with the display device, a time measuring module for measuring a time period elapsed while the pointer is held out of contact with the display screen at the edge thereof, when in said first determining module it is determined that the pointer has got out of contact with the display screen at the edge thereof, a second determining module for determining whether or not the measured elapsed time period is less than a predetermined time period, and output module for outputting the pointing information indicative of a position of the edge of the display screen with which the pointer got out of contact, to indicate that the pointer has been held in the continuous contact with the display screen, when the measured time period is less than the predetermined time period.

According to the present invention, when the time period elapsed while the pointer is held out of contact with the display screen at the edge thereof is less than the predetermined time period, the output device outputs the pointing information indicative of a position of the edge of the display screen with which the pointer got out of contact, to indicate that the pointer has been held in the continuous contact with the display screen. As a result, the image display apparatus can operate smoothly over a plurality of display devices.

Further, since the pointing information delivered from the connected other image display apparatus is synthesized with the pointing information of the present image display apparatus and the synthesized information is outputted. As a result, the image display apparatus can operate over a plurality of display devices without fail.

Furthermore, when pointing information has been input from the other image display apparatus, it is determined that the pointer has shifted from a state where the pointer is in contact with the display screen to a state where the pointer is in contact with a display screen of the other image display apparatus. As a result, it is possible to detect without fail that an operation over a plurality of display devices has been carried out.

Still further, a determining device that determines whether or not the pointer has got out of contact with the edge of the display screen is provided outside of the display screen. As a result, it is possible to detect without fail that the pointer has got out of contact with the edge of the display screen.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
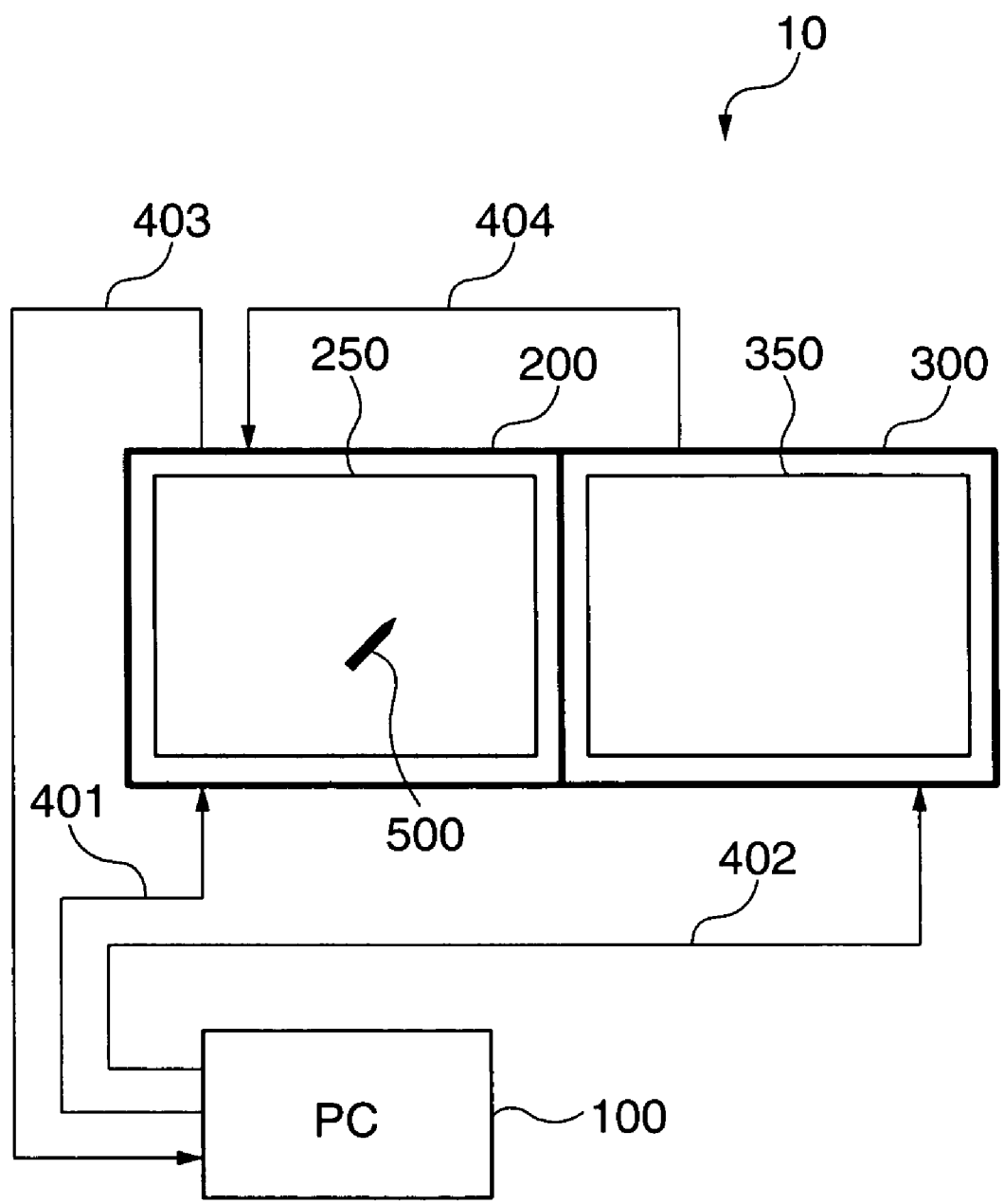
FIG. 1 is a block diagram schematically showing the configuration of a multi display system according to an embodiment of the present invention.

FIG. 1 is a block diagram schematically showing the configuration of a multi display system according to an embodiment of the present invention.

As shown in FIG. 1, the multi display system 10 is comprised of a personal computer (hereinafter referred to as "the PC") 100 (information processing apparatus), a first display 200 including a first display screen 250, and a second display 300 including a second display screen 350. The first display 200 and the second display 300 are arranged side by side and adjacent to each other. Also, the multi display system 10 includes a pen 500 (pointer) for pointing coordinates or for performing a pen-up and pen-down operation, described later, on the screens of the first display screen 250 and the second display screen 350. The first display 200 and the second display 300 are connected to the PC 100 via a display cable 401 and a display cable 402, respectively. Further, the first display 200 is connected to the PC 100 via a mouse signal cable 403 while it is connected to the second display 300 via a mouse signal cable 404.

Figure 2:
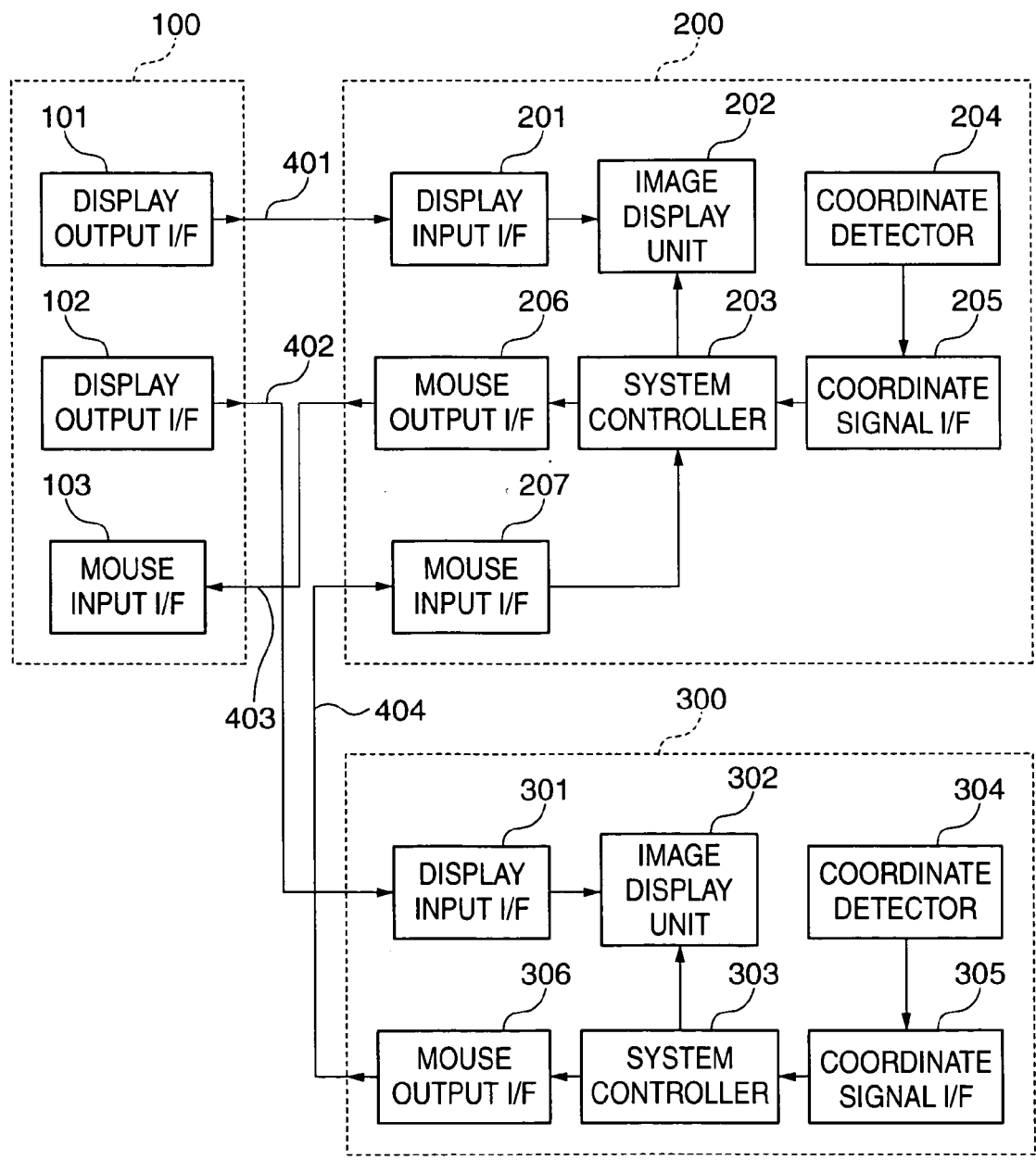
FIG. 2 is a block diagram showing the detailed configuration of the multi display system as shown in FIG. 1.

FIG. 2 is a block diagram showing in more detail the configuration of the multi display system 10 shown in FIG. 1.

As shown in FIG. 2, the PC 100 includes a display output I/F 101, a display output I/F 102, and a mouse input I/F 103.

The first display 200 is comprised of a display input I/F 201, an image display unit 202, a mouse output I/F 206, a mouse input I/F 207, a coordinate detector 204, a coordinate signal I/F 205, and a system controller 203 (a coordinate information output device, and an output apparatus).

The display input I/F 201 is connected to the display output I/F 101 via the display cable 401. The image display unit 202 is connected to the display input I/F 201. The mouse output I/F 206 is connected to the mouse input I/F 103 via the mouse signal cable 403.

The configuration of the second display 300 is basically the same as that of the first display 200, where components of the second display 300 similar to those of the first display 200 are denoted by numerals in the 300s while their last-two digits are kept the same as those of the corresponding components shown in the first display 200.

A display input I/F 301 is connected to the display output I/F 102 via the display cable 402. A mouse output I/F 306 is connected to the mouse input I/F 207 via the mouse signal cable 404.

Coordinate detectors 204 and 304 recognize the image display areas of the respective displays 200 and 300 as coordinate detection areas, and output coordinate information indicative of positions where the pen 500 is detected to contact the screen or goes away from the screen. The coordinate detectors 204 and 304 recognize the situation where the pen 500 contacts the screen as a pen-down, and the situation where the pen 500 goes away from the screen as a pen-up, and generate operation events by associating the situations with button operations of the mouse. There have been proposed several methods for detecting coordinates, such as: a method of detecting contact pressure with which the pen 500 contacts the display screen by a pressure sensor provided inside the display screen; an electromagnetic induction method where a pen generating a magnetic field is used as the pen 500 and the magnetic field is detected by a sensor disposed inside the display screen; an ultrasonic surface acoustic wave method where the physical position of an object on the display screen is detected by an ultrasonic wave oscillator and an ultrasonic sensor arranged at the frame of the display screen or the like; and an infrared technology method where a pen transmitting an infrared ray is used as the pen 500 and the infrared ray is received by a sensor disposed inside the display unit. The present invention, however, is not particularly limited to any of the above mentioned methods.

The coordinate detector 304 detects positional information and an operational event on the display screen of the second display 300 to deliver the detected positional information and the detected operational event to a system controller 303 via a coordinate signal I/F 305. The PC 100 delivers an image signal corresponding to the second display 300 to an image display unit 302 via the display output I/F 102 and the display input I/F 301. The system controller 303 delivers the positional information and the operation event received via the coordinate signal I/F 305 to the system controller 203 as pointing information via the mouse output I/F 306 and the mouse input I/F 207. The image display unit 302 receives and displays the pointing information signal delivered via the display input I/F 301 under the control of the system controller 303.

The coordinate detector 204 detects positional information and an operational event on the display screen of the first display 200 and delivers the detected positional information and the detected operational event to the system controller 203 via the coordinate signal I/F 205. The PC 100 delivers an image signal corresponding to the first display 200 to the image display unit 202 via the display output I/F 101 and the display input I/F 201. The system controller 203 synthesizes the pointing information received via the coordinate signal I/F 205 and the pointing information for the second display 300 received via the mouse input I/F 207 to deliver the resulting information to the mouse input I/F 103 via the mouse output I/F 206. The image display unit 202 receives and displays the signal delivered from the display input I/F 201 under the control of the system controller 203.

Figure 3:
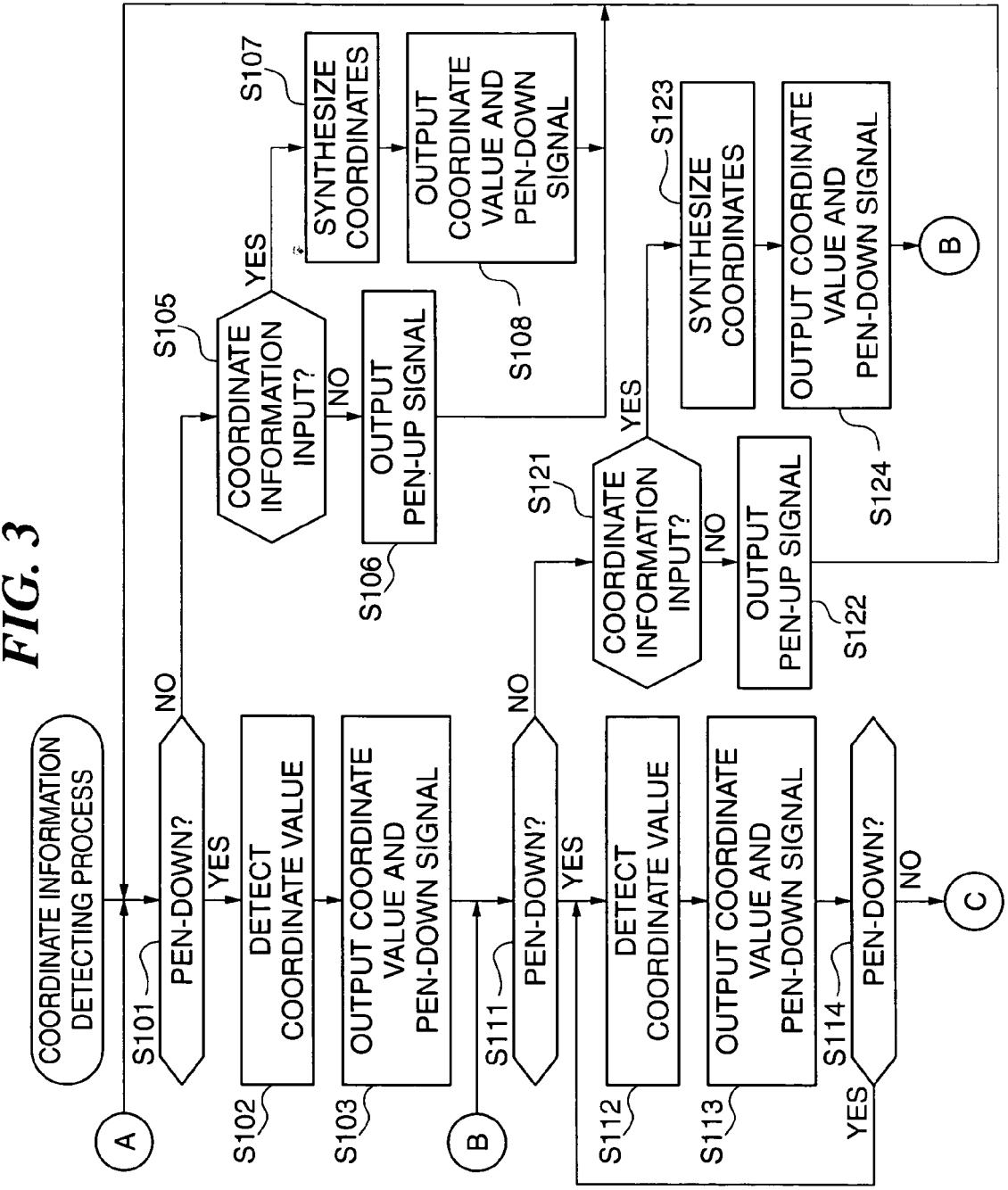
FIG. 3 is a flowchart showing a coordinate information detecting process carried out by a display appearing in FIG. 1.
Figure 4:
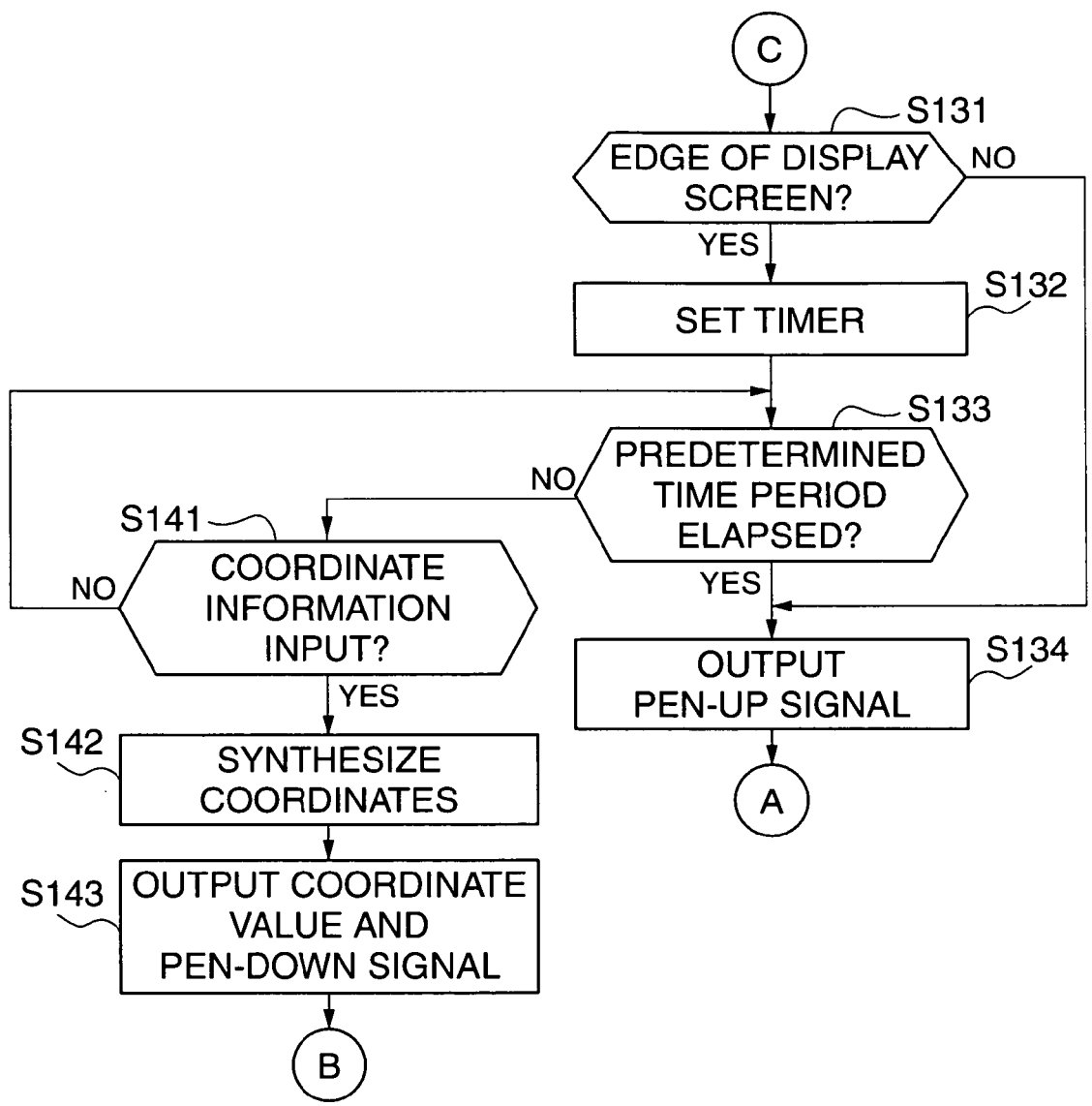
FIG. 4 is a flowchart showing a continued part of the coordinate information detecting process shown in FIG. 3.

FIGS. 3 and 4 are flowcharts showing a coordinate information detecting process carried out by the display 200 in FIG. 1.

The present process is executed by the system controller 203 of the first display 200.

First, a description will be given of processing in the case where a pen-down of the pen 500 is carried out onto the first display 200 and then the pen 500 is dragged from the first display to the second display 300 while holding the pen-down state.

In FIG. 3, it is determined whether or not the pen-down state of the pen 500 has been detected on the first display 200 (step S101). If the pen-down has been detected, then the coordinate value of the pen-down position on the first display 200 is detected (step S102) to output the coordinate information and a pen-down signal to the PC 100 via the mouse output I/F 206 (step S103). Then, it is determined whether or not a pen-down has been detected on the first display 200 (step S111). If no pen-down has been detected, it is further determined whether or not coordinate information has been input from the second display 300 (step S121). If no coordinate information has been input from the second display 300, a pen-up signal is outputted to the PC 100 (step S122), then the process returns to the step S101. The PC 100 determines the above processing as a "click operation" and carries out predetermined processing.

If it is determined in the step S111 that a pen-down state has been detected on the first display 200, the coordinate value of the pen-down position on the first display 200 is detected (step S112) to output the coordinate information and a pen-down signal to the PC 100 via the mouse output I/F 206 (step S113), then it is again determined whether or not a pen-down has been detected on the first display 200 (step S114). If a pen-down has been detected, the processing of the step S112 and the step S113 is repeated. The PC 100 determines the above processing as a "drag operation" and carries out predetermined processing.

If it is determined in the step S114 that no pen-down has been detected on the first display 200, it is determined whether or not the coordinates where a pen-down has no more come to be detected on the first display 200 exist on an edge of the display screen of the first display 200 (step S131). If the coordinates do not exist on the edge of the display screen of the first display 200, a pen-up signal indicating that a pen-up occurred within the range of the display screen is outputted to the PC 100 (step S134), and then the process returns to the step S101. In the step S131, the detection of the display screen edge can be carried out by determining whether or not the detected coordinates are identical to the coordinates of the display screen edge. Alternatively, a detection coordinate area, within which the coordinates of the display screen edge are included, is provided inside the display area so that a determination is made by checking whether or not the detected coordinates exist within the detection coordinate area. The PC 100 determines the above processing as "termination of a drag operation" and carries out predetermined processing.

If it is determined in the step S131 that the coordinates, where a pen-down has no more come to be detected on the first display 200, exist on the display screen edge of the first display 200, a timer for measuring a predetermined time period set in advance based on the travel time period of the pen 500 across the border between the first display 200 and the second display 300 is set (step S132), and then the process proceeds to a step S133. The above timer may be a type which counts down from the predetermined time period, and may be a type which counts up towards the predetermined time period. In the next step S133, it is determined whether or not the timer has completed counting the predetermined time period. If the timer has not completed counting the predetermined time period, it is then determined whether or not coordinate information has been input from the second display 300 (step S141). If no coordinate information has been input from the second display 300, the processing of the step S133 and the step S141 is repeated until the timer counts up or down the predetermined time period. The PC 100 determines the above processing as a "drag operation continuing on the second display 300" in a state where the pen 500 is held out of contact with both of the first display 200 and the second display 300, and carries out predetermined processing.

If it is determined in the step S133 that the timer has completed counting the predetermined time period, a pen-up signal is outputted to the PC 100 via the mouse output I/F 206 (step S134), and then the process returns to the step S101. The PC 100 determines the above processing as "termination of a drag operation" on the second display 300 and carries out predetermined processing.

If it is determined in the step S141 that coordinate information has been input from the second display 300, the coordinate information is converted into a coordinate value to be applied to a synthesized screen made by synthesizing the display screen of the first display 200 and that of the second display 300 (step S142) and the coordinate value is outputted along with a pen-down signal to the PC 100 via the mouse output I/F 206 (step S143), followed by the process returning to the step S111. Here, the operation by the pen 500 on the display screens has smoothly shifted from the first display screen 250 to the second display screen 350. Since the operation has thus moved from the first display screen 250 to the second display screen 350, no pen-down signal is detected on the first display 200 (NO to the step S111). Then, it is determined whether or not coordinate information has been input from the second display 300 (step S121).

If it is determined in the step S121 that coordinate information has been input from the second display 300, the coordinate information from the first display 200 and the coordinate information from the second display 300 are synthesized (step S123), and the synthesized coordinate information is outputted along with a pen-down signal to the PC 100 via the mouse output I/F 206 (step S124). Then, the process returns to the step S111, repeating the processing of the step S123 and S124 until a pen-down is detected. The PC 100 determines the above processing as a "drag operation continuing" on the second display 300 and carries out predetermined processing.

If it is determined in the step S121 that no coordinate information has been input from the second display 300, a pen-up signal is outputted to the PC 100 via the mouse output I/F 206 (step S122) and then the process returns to the step S101. The PC 100 determines the above processing as "termination of the drag operation" on the second display 300 and carries out predetermined processing.

Next, a description will be given of the case where a pen-down operation is carried out by the pen 500 on the first display 200, then the pen 500 is dragged onto the second display 300, and then the pen 500 is returned to the first display 200 while continuing dragging.

In this case, in the state where the processing of the step S123 and the step S124, that is, in the "drag operation continuing" state on the second display 300, if a pen-down is detected on the first display 200 (YES to the step S111), a coordinate value at the pen-down position is detected (step S112). At this time, processing similar to "drag operation continuing" processing carried out on the first display 200 in the steps S131 to S133 and the step S141 is carried out on the second display 300. This processing makes it possible for the drag operation to be carried out smoothly from the second display 300 to the first display 200.

Further, when a coordinate pointing operation is carried out via the second display 300, no pen-down is detected on the first display 200 as a result of the determination in the step S101. Then, it is determined whether or not coordinate information has been input from the second display 300 (step S105). If coordinate information has been input from the second display 300, the coordinate information on the first display 200 and the coordinate information from the second display 300 are synthesized (step S107), and the synthesized coordinate information is outputted along with a pen-down signal to the PC 100 via the mouse output I/F 206 (step S108). Then, the process returns to the step S101. Here, if a drag operation is carried out by the pen 500 from the second display 300 to the first display 200, then, in the step S101, a pen-down is detected on the first display 200. On the other hand, if only a click operation is carried out by the pen 500 on the second display 300, then, in the step S101, no pen-down is detected on the first display 200. Then, it is determined in the step S105 that no coordinate information has been input on the second display 300, and then a pen-up signal is outputted (step S106), followed by the process returning to the step S101.

According to the process shown in FIGS. 3 and 4, in a multi display system comprised of two displays, if coordinates on the first display 200, at which a pen-down has no more come to be detected, exist on the edge of the first display 200 (YES to the step S131), the predetermined time period has not elapsed (NO to the step S133), and further, coordinate information has been input from the second display 300 (YES to the step S141), the coordinate information is converted into coordinates on a screen made by synthesizing the screen of the first display 200 and the screen of the second display 300 (step S142), and information on the converted coordinates is outputted along with a pen-down signal to the PC 100 (step S143). This processing makes it possible for a drag operation to be carried out smoothly over a plurality of displays.

The multi display system 10 according to the present embodiment is configured such that two displays are arranged side by side. However, the two displays may be arranged one behind the other or the system may be comprised of three or more displays.

Figure 5:
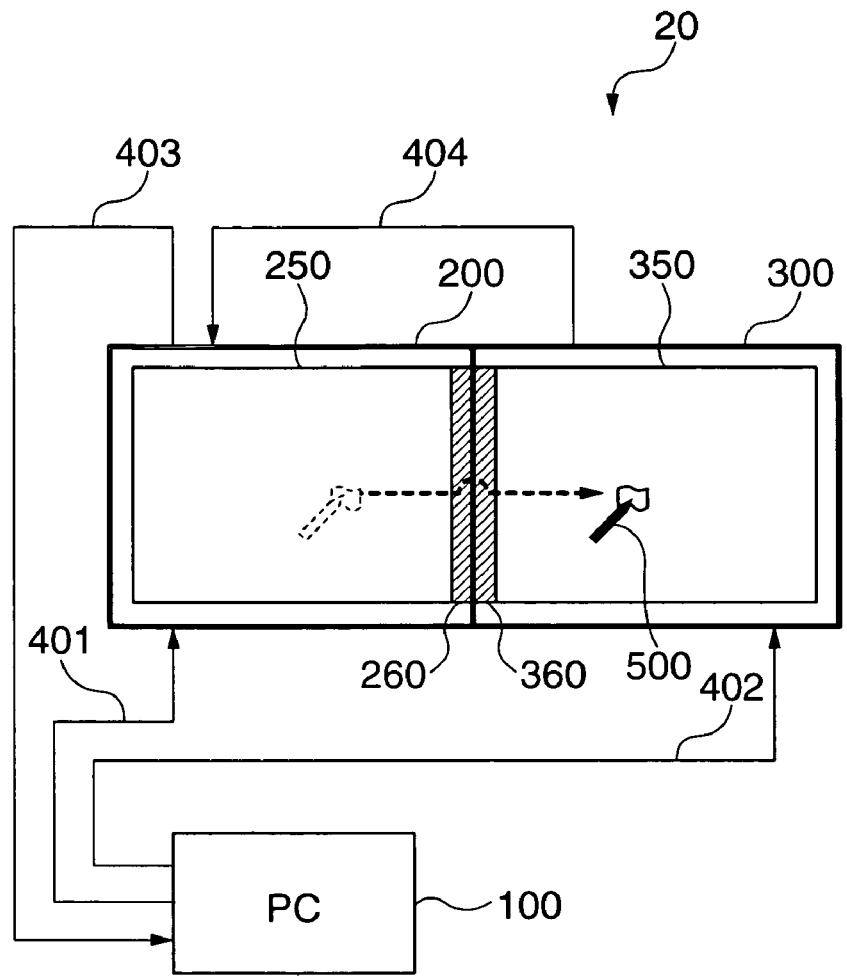
FIG. 5 is a block diagram schematically showing a variation of the multi display system shown in FIG. 1.

FIG. 5 is a schematic block diagram showing a variation of the multi display system 10 shown in FIG. 1.

The multi display system 20 shown in FIG. 5 has basically the same configuration as that of the system in FIG. 1 while including coordinate detectors 204 and 304 as shown in FIG. 2. Component elements corresponding to those in FIG. 1 are denoted by the same reference numerals while overlapping description is omitted. Only component elements that are different from those in the multi display system 10 will be described below.

In FIG. 5, a first display 200 includes a first travel detecting means 260 provided at an edge thereof, which is in contact with a second display 300. The second display 300 includes a second travel detecting means 360 provided at an edge thereof, which is in contact with the first display 200.

The coordinate detection areas to be detected by the coordinate detectors 204 and 304 are expanded to the first travel detecting means 260 and the second travel detecting means 360, respectively. When the pen 500 is moved in a pen-down state from the first display screen 250 to the second display screen 350 or vice versa, the coordinate detectors 204 and 304 detect extrusion of the pen 500 out of the display screen areas from whether or not the pen 500 come into contact and get out of contact with the first travel detecting means 260 and the second travel detecting means 360. By this detection, it is determined whether or not the pen 500 has moved across the border between the first display screen area 250 and the second display screen area 350.

According to the multi display system 20 shown in FIG. 5, the coordinate detectors 204 and 304 detect extrusion of the pen 500 from the respective screen areas when the pen 500 is moved in the pen-down state from the first display screen area 250 to the second display screen area 350 or vice versa. By this detection, it is determined whether or not the pen 500 has moved across the border between the first display screen 250 and the second display screen 350. Therefore, it is possible to reliably detect the movement of the pen 500 from the display screen area 250 to the second display screen area 350 or vice versa.

Figure 6:
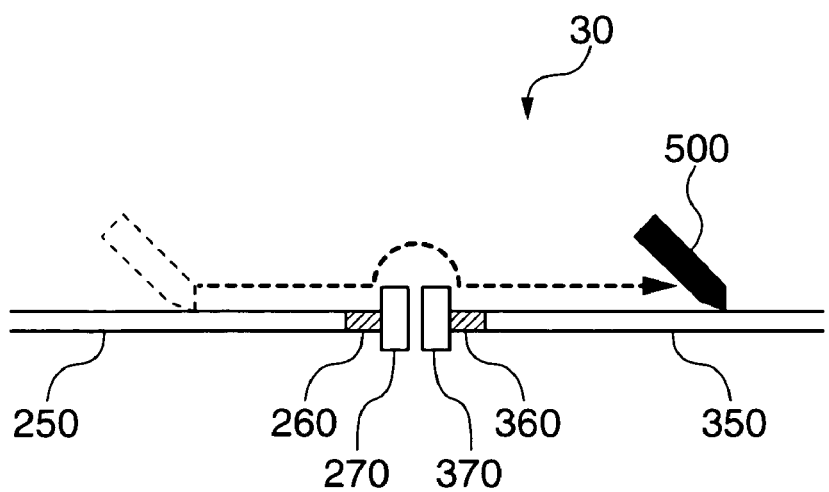
FIG. 6 is a cross-sectional diagram showing another variation of the multi display system shown in FIG. 1.

FIG. 6 is a cross-sectional diagram showing another variation of the multi display system 10 shown in FIG. 1.

The multi display system shown in FIG. 6 is basically the same configuration as that of FIG. 5. Here, component elements corresponding to those of FIG. 5 are denoted by the same reference numerals and overlapping description is omitted. Only component elements that are different from those in the multi display system 20 of FIG. 5 will be described below.

In FIG. 6, the first travel detecting means 260 is provided with a first screen frame 270 while the second travel detecting means 360 is provided with a second screen frame 370.

The first screen frame 270 and the second screen frame 370 have a height greater than that of the first display screen area 250 and the second display screen area 350. When the pen 500 is moved from the first display screen area 250 to the second display screen area 350 or vice versa, the screen frames 270 and 370 act as stoppers so that the pen 500 can move in contact with the first travel detecting area 260 and the second travel detecting area 360 without fail.

According to the multi display system 30 shown in FIG. 6, when the pen 500 is moved from the first display screen area 250 to the second display screen area 350 or vice versa, it is possible to detect movement of the pen 500 from the first display screen area 250 to the second display screen area 350 or vice versa with more certainty by virtue of the screen frames 270 and 370 acting as stoppers.

It should be noted that in a multi display system where a plurality of displays configured in the same way as the displays 200 or 300, for example four displays, are disposed in the left, right, top and bottom arrangement, each of the displays includes its travel detecting means 260 or 360 at edges thereof, which is in contact with other displays.

In the above-described embodiment and variations, the pen 500 is used as the pointing device. Alternatively, the present invention can be applied to the case where an operator's finger is used as the pointer.

It is to be understood that the object of the present invention may also be accomplished by supplying a system or an apparatus with a storage medium (or a recording medium) in which a program code of software, which realizes the functions of any of the above described embodiment and variations is stored, and causing a computer (or CPU or MPU) of the system or apparatus to read out and execute the program code stored in the storage medium.

In this case, the program code itself read from the storage medium realizes the functions of any of the above described embodiment and variations, and hence the program and the storage medium in which the program code is stored constitute the present invention.

Further, it is to be understood that the functions of any of the above described embodiment and variations may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiment and variations may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of any of the above described embodiment and variations on a computer, and the form of the program may be an object code, a program executed by an interpreter, or script data supplied to an OS.

Examples of the storage medium for supplying the program code include a floppy (registered trademark) disk, a hard disk, a magnetic-optical disk, a CD-ROM, a MO, a CD-R, a CD-RW, a DVD (a DVD-ROM, a DVD-RAM, a DVD-RW, a DVD+RW), a magnetic tape, a nonvolatile memory card, and a ROM. Alternatively, the program may be supplied by downloading from another computer, a database, or the like, not shown, connected to the Internet, a commercial network, a local area network, or the like.

This application claims priority from Japanese Patent Application No. 2004-167626 filed Jun. 4, 2004, which is hereby incorporated by reference herein.

What is claimed is:

1. An image display apparatus for displaying an image on neighboring first and second display screens, comprising:
   an output unit that outputs to an external device pointing information based on a position pointed by a pointer;
   a first determining unit that determines whether or not the position pointed by the pointer is moved from an edge of the first display screen to the second display screen after the pointer has come into continuous contact with the first display screen;
   an acquiring unit that acquires a time period elapsed during which the pointer is out of contact with the edge of the first display screen before the pointer comes into contact with the second display screen, when the first determining unit determines that the pointer is moved from the edge of the first display screen after the pointer has come into continuous contact with the first display screen; and
   a second determining unit that determines whether or not the acquired elapsed time period is less than a predetermined time period,
   wherein said output unit outputs to the external device the pointing information indicative of the pointer continuously pointing from the position where the pointer is out of contact from the first display screen to the position where the pointer comes into contact with the second display screen, in a case where said second determining unit determines that the acquired elapsed time period is less than the predetermined time period, and
   wherein said output unit outputs to the external device the pointing information indicating that the pointer points at the second display screen after outputting the pointing information indicating the pointer pointed at the edge of the first display screen, in a case where said second determining unit determines that the acquired elapsed time period is longer than the predetermined time period.

2. An image display apparatus as claimed in claim 1, wherein said output unit outputs to the external device the pointing information indicative of the pointer being dragging from the position where the pointer is out of contact with the edge of the first display screen to the position where the pointer comes into contact with the second display screen, in a case where said second determining unit determines that the acquired elapsed time period is less than the predetermined time period.

3. An image display apparatus as claimed in claim 1, wherein said output unit is configured to detect the position of the pointer outside of the first or second display screen.

4. A multi display system comprising a plurality of the image display apparatus as claimed in claim 1, wherein said image display apparatuses are arranged side by side.

5. An image display apparatus according to claim 1, wherein:
   said output unit outputs to the external device, in a case where said second determining unit determines that the acquired elapsed time period is longer than the predetermined time period, non-contact information indicating that the pointer is out of contact with the first and second display screens after outputting to the external device the pointing information indicating that the pointer pointed at the edge of the first display screen, and
   said output unit outputs to the external device the pointing information indicating that the pointer points at the second display screen after outputting the non-contact information to the external device.

6. A coordinate information output method applied to an image display apparatus for displaying an image on neighboring first and second display screens, the method comprising:
   an output step of outputting pointing information based on a position pointed by a pointer to an external device;
   a first determining step of determining whether or not the position pointed by the pointer is moved from an edge of the first display screen to the second display screen after the pointer has come into continuous contact with the first display screen;
   an acquiring step of acquiring a time period elapsed during which the pointer is out of contact with the edge of the first display screen before the pointer comes into contact with the second display screen, when said first determining step determines that the pointer is moved from the edge of the first display screen to the second display screen after the pointer has come into continuous contact with the first display screen; and
   a second determining step of determining whether or not the acquired elapsed time period is less than a predetermined time period and,
   wherein said output step outputs to the external device the pointing information indicative of the pointer continuously pointing from the position where the pointer is out of contact from the first display screen to the position where the pointer comes into contact with the second display screen, in a case where said second determining step determines that the acquired elapsed time period is less than the predetermined time period, and
   wherein said output step outputs to the external device the pointing information indicating that the pointer points at the second display screen after outputting the pointing information indicating that the pointer pointed at the edge of the first display screen, in a case where said second determining step determines that the acquired elapsed time period is longer than the predetermined time period.

7. A coordinate information output method as claimed in claim 6, wherein said output step outputs to the external device the pointing information indicative of the pointer being dragged from the position where the pointer is out of contact with the edge of the first display screen to the position where the pointer comes into contact with the second display screen, in a case where said second determining step determines that the acquired elapsed time period is less than the predetermined time period.

8. A coordinate information output method according to claim 6, wherein:
   said output step outputs to the external device, in a case where said second determining step determines that the acquired elapsed time period is longer than the predetermined time period, non-contact information indicating that the pointer is out of contact with the first and second display screens after outputting to the external device the pointing information indicating that the pointer pointed at the edge of the first display screen, and
   said output step outputs to the external device the pointing information indicating that the pointer points at the second display screen after outputting the non-contact information to the external device.

9. A computer-readable medium storing a computer program for outputting a coordinate information for an image display apparatus for displaying an image on neighboring first and second display screens, the program comprising:

an output module for outputting pointing information based on a position pointed by a pointer to an external device;

a first determining module for determining whether or not the position pointed by the pointer is moved from an edge of the first display screen to the second display screen after the pointer has come into continuous contact with the first display screen;

a time measuring an acquiring module for acquiring a time period elapsed during which the pointer is out of contact with the edge of the first display screen before the pointer comes into contact with the second display screen, when said first determining module determines that the pointer is moved from the edge of the first display screen to the second display screen after the pointer has come into continuous contact with the first display screen; and a second determining module for determining whether or not the acquired elapsed time period is less than a predetermined time period and, wherein said output module outputs to the external device the pointing information indicative of the pointer pointing continuously from the position where the pointer is out of contact from the first display screen to the position where the pointer comes into contact with the second display screen, in a case where said second determining module determines that the acquired elapsed time period is less than the predetermined time period, and wherein said output module outputs to the external device the pointing information indicating that the pointer points at the second display screen after outputting the pointing information indicating that the pointer pointed at the edge of the first display screen, in a case where said second determining module determines that the acquired elapsed time period is longer than the predetermined time period.

10. An image display apparatus for displaying an image on neighboring first and second display screens, comprising:

a controller configured to:

output to an external device contact information indicating that a pointer is in contact with the display screen and pointing information indicative of the position pointed by the pointer;

output to the external device the pointing information indicative of the pointer continuously pointing from the position where the pointer is out of contact from the first display screen to the position where the pointer comes into contact with the second display screen, in a case where the pointer is out of contact with the first display screen at the edge of the first display screen when the pointer comes into contact with the second display screen within a predetermined time; and output to the external device non-contact information indicating that the pointer is out of contact with the first and second display screens in a case where the pointer is out of contact with the first display screen at the edge of the display screen when the pointer is out of contact with the second display screen for the predetermined time.

11. An image display apparatus as claimed in claim 10, wherein said controller is configured to output to the external device the pointing information in a case where the pointer is out of contact with the first display screen at the edge of the first display screen when the pointer comes into contact with the second display screen within a predetermined time, after the pointer is in contact with the first display screen continuously.

* * * * *